3,793,461
INTRAVENOUS ADMINISTRATION OF
MALTOSE TO DIABETICS
Shokichi Yuen, Okayama, Japan, assignor to Hayashibara
Company, Okayama, Japan
Filed Aug. 11, 1971, Ser. No. 170,919
Claims priority, application Japan, Aug. 11, 1970,
45/70,525
Int. Cl. A61k 27/00
U.S. Cl. 424—180                                    6 Claims

ABSTRACT OF THE DISCLOSURE

The production of intravenous injections for sugar supplement in which a maltose product consisting of over 95% of maltose and the remainder being maltotriose is used and which are characterized in that said injections possess concentrations of maltose equal to two times that of the glucose in the corresponding injections using glucose as the supplement sugar.

---

Figure 1:
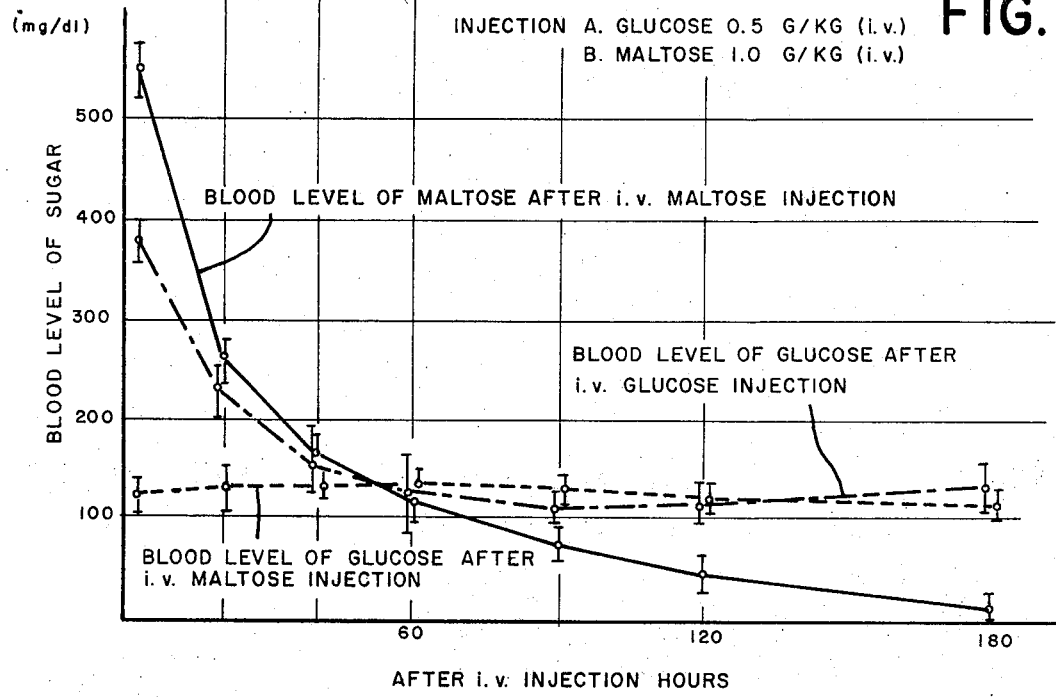

The present invention relates to a process for the production of a sugar solution which may be administered intravenously to patients of common diseases or diabetics. More particularly, the invention comprises the production of a pure maltose injection, which can be administered at a higher concentration, double fold that of glucose used in usual methods, and which does not elevate blood sugar level and which is also effective for longer hours as energy source for patients with common diseases or diabetics.

Conventionally, aqueous solutions of glucose or fructose were mainly used as sugar supplement solutions. Recently, xylytol is used to replace glucose in the case of diabetics. But since no reliable results on the clinical efficiency of xylytol are so far available the substance requires further investigations. Moreover the substance is still very expensive.

The inventor screened various sugars attempting to discover sugars which (1) do not elevate blood sugar level and (2) may be administered in a high concentration and be digested and absorbed gradually in vivo. The inventors continued tests on animals and humans with disaccharides which possess high solubilities and, of course, are nontoxic. The tests resulted in the finding that maltose is an optimum sugar for the attainment of the above objects.

Maltose is a disaccharide, which possesses a molecular weight about two times of that of glucose and over two times that of xylytol. Maltose is well known as the major constituent of malt-converted starch syrups. Maltose in the form of a starch hydrolyzate is widely used, however, maltose in a pure form is not available on the market. The maltose purity of reagents on the market is at most from about 90% to about 95%. The reagents, which possess one molecule of crystal-water, are available in fine, white crystalline powders. Syrups with maltose contents of 60% are obtained by hydrolyzing starch with the enzyme of wheat malt. The purification and crystallization of the syrups has been quite difficult, and thus products with purities exceeding 95% have been unattainable. In addition the conventional products were expensive and had very few applications. Since the molecular weight of maltose is about two times higher than that of glucose, which is a substance commonly used as a sugar supplement, and more than two times that of xylytol, the osmotic pressure of maltose is about ½ of those of the above mentioned monosaccharides, thus maltose could be used twice as much as the monosaccharides for injection solutions. Therefore maltose provides twice as many calories, and since an enzyme that decomposes maltose is absent in human blood it is assumed that maltose is absorbed intact into organs and is digested gradually without elevating blood sugar values. However, no one has studied the efficiency, and utilization of intravenously administrated maltose so far. On noting the facts that maltose is a sugar which is produced by the hydrolysis of starch within the digestive organs, that maltose was utilized conventionally as food, and that it is a nontoxic nutrient source, the inventor performed tests on the efficiencies of maltose as a sugar supplement.

TEST RESULTS

The attached drawings in FIGS. 1 to 5 show the variation of blood glucose (sugar) level following injection of either glucose or maltose.

(1) An increase of blood sugar values following intravenous injection of maltose was not observed.

In the case of excessive blood sugar level no increase of blood sugar level effected by the maltose intravenous injection was noticed. An increase of blood sugar level was observed rather in animals with low blood sugar values.

A. Tests of intravenous injections of maltose in rabbits

Since maltose is absent from the bloods of both humans and rabbits, the inventor used rabbits in his tests. As is apparent from FIG. 1 in which the results are summarized, 0.5 gr. of glucose was administered per kg. rabbit. Since maltose is a disaccharide a double amount of maltose was administrated compared to the amount of glucose usually administrated. Most of the administrated maltose was absorbed within 60 minutes, while glucose maintained its normal level showing no difference. In the case $^{14}C$ labeled maltose is used, however, the amount of $^{14}C$ glucose in blood increases whereas no increase of total glucose is exhibited. From the above facts a portion of maltose seems to be hydrolyzed, however, the mechanisms are unknown.

B. Intravenous injections in human

Subjects: A and B (two subjects).—Method of administration: Two subjects were given IV infusions of 500 ml. of 10% of maltose solution over one hour period.

Method of determinations: 7–10 ml. of blood was collected at 0, 1, 3, 6, 10 and 24 hours, following the IV injections. Urine was also collected immediately after the collections of the blood. The urine samples were measured and 10 ml. of each sample were placed in test tubes, to which were each added a drop of chloroform and then stored in a refrigerator.

Results.—(a) The glucose and maltose concentrations in blood following IV injection of maltose, (mg. %).

A.

| Hour | 0 | 1 | 3 | 6 | 10 | 24 |
|---|---|---|---|---|---|---|
| Glucose | 78 | 101 | 78 | 74 | 95 | 78 |
| Maltose | 0 | 113 | 38 | 20 | 0 | 0 |

B.

| Hour | 0 | 1 | 3 | 6 | 10 | 24 |
|---|---|---|---|---|---|---|
| Glucose | 99 | 111 | 101 | 97 | 96 | 120 |
| Maltose | 0 | 96 | 33 | 13 | 0.5 | 5 |

(b) The amount of glucose and maltose excreted in urine (gr.).

| | 0 | 1 | 3 | 6 | 10 | 12 |
|---|---|---|---|---|---|---|
| Glucose | 0 | 7.260 | 0.4455 | 0.0161 | 0.0171 | 0.0768 |
| Maltose | | 2.2848 | 0.1855 | 0.0269 | 0.0753 | 0.1099 |
| | 0 | 9.5448 | 0.6310 | 0.0430 | 0.0522 | 0.1467 |

NOTE.—Total = 10.4177 gr.; 22.84%.

B.

|  | 0 | 1 | 3 | 6 | 10 | 12 |
|---|---|---|---|---|---|---|
| Glucose | 0 | 1.7002 | 1.2932 | 0.0555 | 0.0090 | 0.0270 |
| Maltose |  | 10.2508 | 3.6142 | 0.0999 | 0.0173 | 0.0390 |
|  |  | 11.9510 | 4.9076 | 0.1554 | 0.0263 | 0.0660 |

Note.—Total = 17.1059 gr.; 34.21%.

C. Test of glucose and maltose individually IV injected to alloxan-diabetic patients.—As apparent from the test results shown in FIG. 2, IV injection of glucose causes a blood sugar level increase from 500 ml./dl. to 700 ml./dl., while maltose injection causes hardly any increase, showing a decrease of blood maltose value and an absorbance of maltose.

Figure 5:
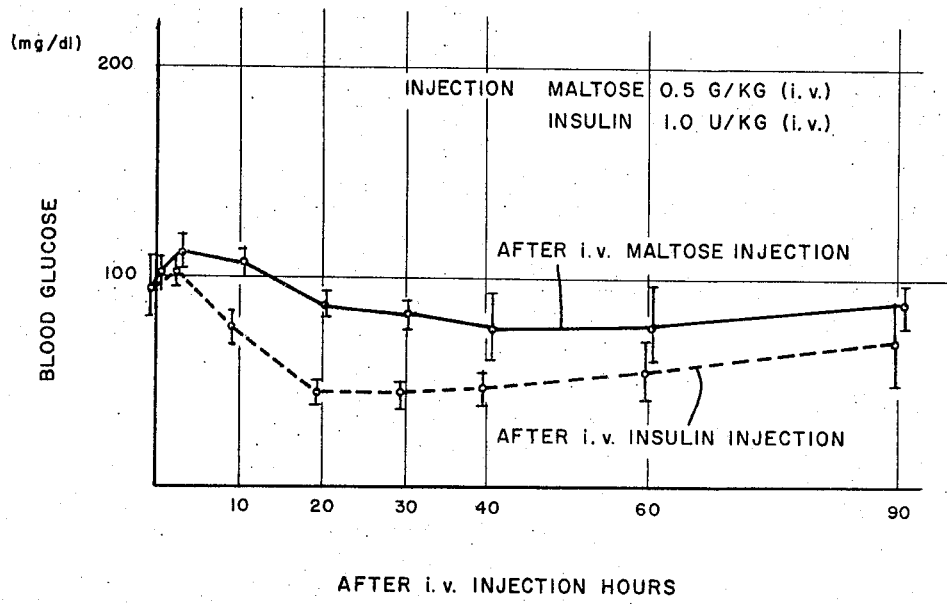

D. The effect of maltose on insulin-low-blood-sugar-disease patients.—In this case an increase of glucose amount was observed following maltose injections. The results are illustrated in FIG. 5.

From the above results the inventor demonstrated that no increase is effected by IV injections of maltose on normal subjects as well as diabetics, and that maltose is absorbable in vivo and is a substance capable of attaining the purposes of a sugar supplement.

Figure 3:
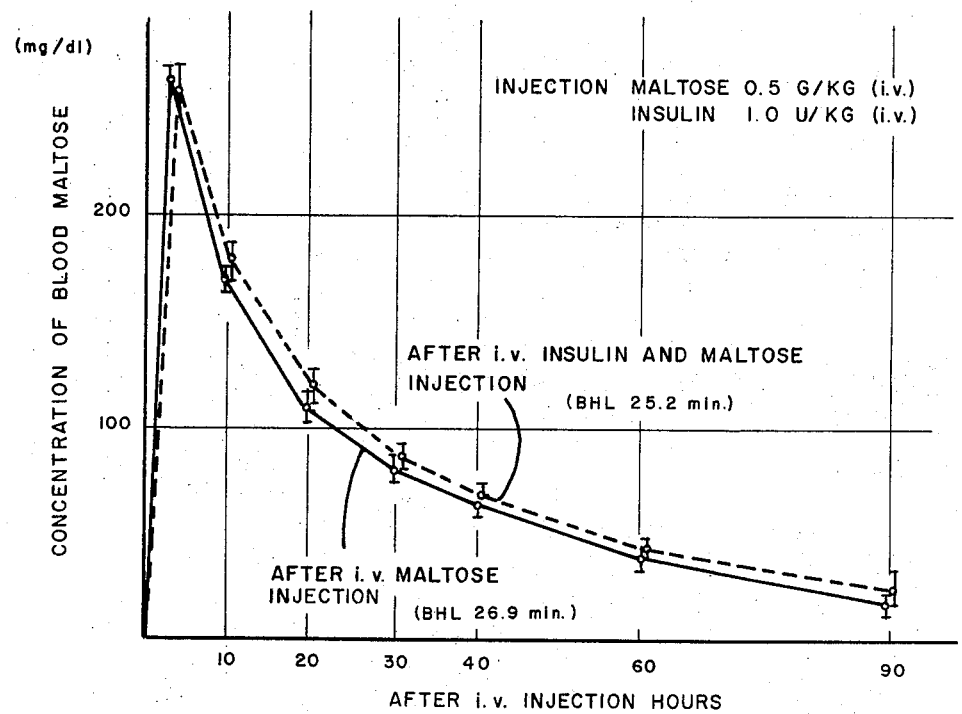
Figure 2:
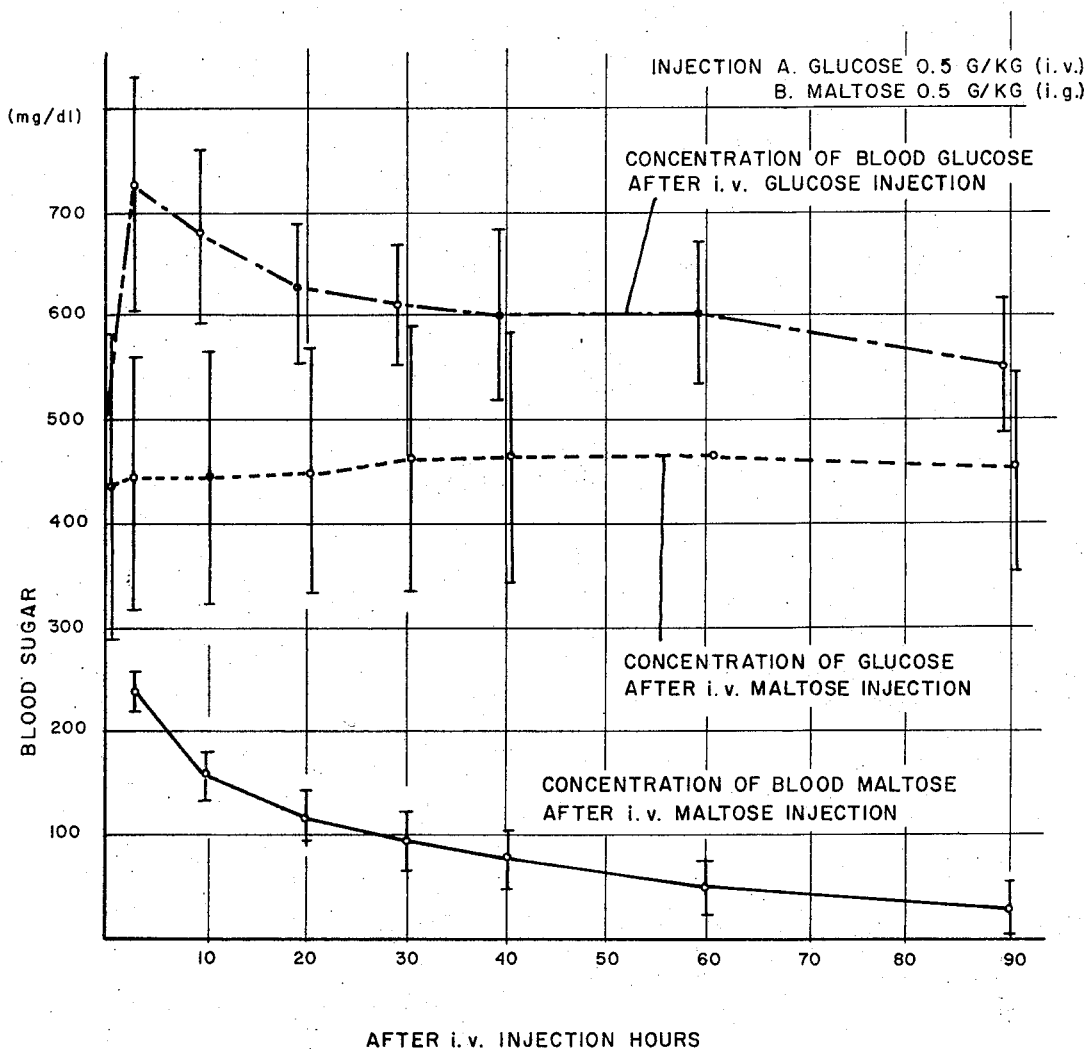
Figure 4:
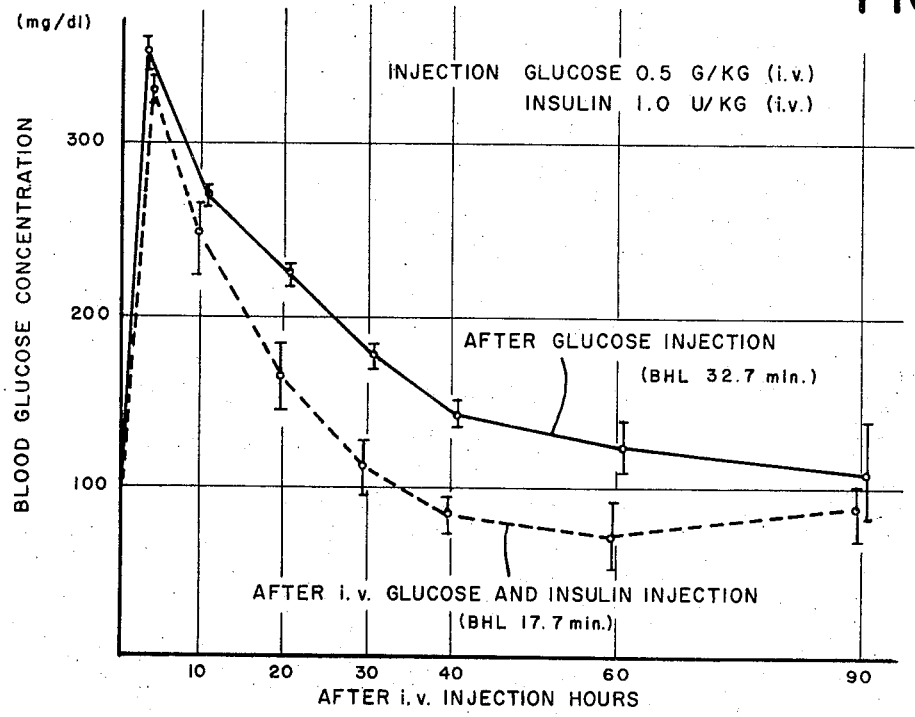

(2) Utilization of maltose in vivo:

The inventor studied the effects of insulin on the blood glucose concentration following administration of maltose. As FIG. 3 shows maltose is independent of insulin. On the contrary, an increase of glucose absorbance effected by insulin was observed as shown in FIG. 4, following the administration of glucose with insulin. Therefore in case insulin is necessary for the migration of glucose to glucose-1-phosphate and glucose-6-phosphate it may be conceived that disaccharides are absorbed intact or absorbed in some other form, other than glucose when utilized in vivo following hydrolysis, because maltose is absorbed without any relationship to insulin.

The distribution of maltose in the body 24 hours following administration of $^{14}C$ labeled maltose, 2 g./kg., was investigated. The results showed that the highest amount was found in the liver, secondly in the rectum, and widely found in the heart, lung, stomach, muscles, duodenum, kidney and spleen. The results are shown in Table 1.

TABLE 1

[Distribution of $^{14}C$ in various organs (24 hours following the administration of maltose, 2 gr./kg.)]

|  | D.p.m./0.5 g. |
|---|---|
| Heart | 220 |
| Lung | 200 |
| Liver | 2,860 |
| Stomach | 260 |
| Duodenum | 400 |
| Kidney | 580 |
| Spleen | 500 |
| Muscles | 560 |
| Rectum | 1,180 |
| Gonad | 360 |

Note.—Maltose/glucose in liver 14.8/85.2. It is impossible to measure the ratio maltose/glucose in the other organs except liver because of the small quantity.

The inventors performed tests on the oxidation from $^{14}C$-labeled maltose to $^{14}CO_2$ with slices of tissues, resulting in the findings that $^{14}C$-labeled maltose oxidizes into $^{14}CO_2$ on brain and kidney slices and that the oxidation to $^{14}CO_2$ is effected by the concentration of maltose. The method used in the tests was as follows. To 220 mg. of tissue slice was added 1.5 ml. of KHB buffer solution ($2 \times 10^5$ d.p.m.), placed in a chamber filled with 95% $O_2$ and 5% of $CO_2$ gases, stirred for one hour at 37° C., added 0.5 ml. of $6N$—$H_2SO_4$ and 0.25 ml. of 1 M hyamine, stirred 30 minutes, and then 0.1 ml. of hyamine was collected to determine the radioactivity. The results obtained are given in Table 2.

TABLE 2

| Organ: | Cpm./g. tissue, cpm. |
|---|---|
| Brain | $2.52 \times 10^4$ |
| Kidney | $3.62 \times 10^4$ |
| Liver | $0.10 \times 10^4$ |

More particularly, the amount of $^{14}CO_2$ formation is in the relation of kidney>brain>liver, which corresponds with maltase activities found in the organs. Therefore the tissues of rats are considered to possess the maltase activities to metabolize in vivo the maltose used as substrate into $CO_2$.

In the above tests to certain amounts of $^{14}C$-labeled maltose was added cold maltose, and by raising the concentration of the whole concentration of maltose, the amount of $^{14}CO_2$ formation was kept in proportionation with the amount of cold maltose added. It was demonstrated that the formation of $^{14}CO_2$ is an attribute of the metabolism of maltose.

As the following Table 3 shows, in the tests performed with diaphragms of rabbits similar amounts of absorbance were observed with glucose and maltose. Furthermore tests on the effects of insulin on the absorbances of glucose and maltose showed that the addition of insulin had an effect on glucose whereas no effect on maltose.

TABLE 3.—GLUCOSE AND MALTOSE UPTAKE IN RAT DIAPHRAGM

[Mg./g. tissue/hr.]

| Experiment number | Glucose | Maltose |
|---|---|---|
| 1 | 4.10 | 4.28 |
| 2 | 4.43 | 4.48 |
| 3 | 5.24 | 4.70 |
| Mean ± S.D. | 4.59±0.59 = | 4.49±0.21 |

TABLE 4.—THE EFFECTS OF INSULIN ON GLUCOSE AND MALTOSE UPTAKE IN RAT DIAPHRAGMS

[Mg./g. tissue/hr.]

|  | Control | Insulin |
|---|---|---|
| Glucose | 2.97 | 4.22 |
|  | 3.39 | 4.42 |
|  | 3.95 | 4.26 |
|  | 2.78 | 3.45 |
| Mean±S.D. | 3.27±0.52 [1] > | 4.09±0.21 [1] |
| Maltose | 2.35 | 2.57 |
|  | 4.05 | 3.88 |
|  | 3.40 | 3.63 |
| Mean±S.D. | 3.27+0.86 ≈ | 3.36±0.07 |

[1] 0.02 p 0.05.

Furthermore, the relationship between the metabolism of maltose and glucose were investigated resulting in the findings given in Table 5. As apparent from the table, maltose can be replaced with glucose, and by increasing the concentration of the added glucose, the amount of maltose can be reduced. (Table 6). Alternatively, glucose can be replaced with maltose and by increasing the concentration of the added maltose the amount of glucose can be reduced. (Table 7).

The results of investigation on the effects of insulin on the metabolism of sugars are given in Table 8. As apparent from the table, the addition of insulin stimulates the metabolism of glucose and increases the production of $CO_2$, while maltose is not stimulated by the addition.

TABLE 5.—THE OXIDATION OF MALTOSE AND GLUCOSE INTO $CO_2$ IN VARIOUS TISSUES

| Tissue | Sugar | |
|---|---|---|
|  | Maltose-$^{14}C$ (c.p.m.[1]) | Glucose-$^{14}C$ (c.p.m.) |
| Brain | 2,067 | 5,801 |
| Heart | 208 | 1,464 |
| Diaphragm | 236 | 1,218 |
| Liver | 133 | 695 |
| Muscle | 112 | 348 |
| Adipose tissue | 268 | 501 |
| Kidney | 2,943 | 3,271 |

[1] Mean, n=3. Incubating for 1 hour.

TABLE 6.—THE EFFECTS OF GLUCOSE ON THE METABOLISM OF MALTOSE

[Maltose-14C. Tissue; Brain]

| Experiment number | Sugar (c.p.m.) | | | |
|---|---|---|---|---|
| | M, 2 mg./ml. G — | M, 2 mg./ml. G, 1 mg./ml. | M, 2 m.g/ml. G, 5 mg./ml | M, 2 mg./ml. G, 10 mg./ml. |
| 1 | 1,048 | 469 | 266 | 162 |
| 2 | 980 | 395 | 272 | |
| 3 | 1,622 | 408 | 284 | 260 |
| Mean | 1,229 | 424 | 274 | 181 |

NOTE.—M=Maltose, G=Glucose.

TABLE 7.—THE EFFECTS OF MALTOSE ON THE METABOLISM GLUCOSE

[Glucose-14C. Tissue; Brain]

| Experiment number | Sugar (c.p.m.) | | | |
|---|---|---|---|---|
| | G, 2 mg./ml. M — | G, 2 mg./ml. M, 1 mg./ml. | G, 2 mg./ml. M, 5 mg./ml. | G, 2 mg./ml. M, 10 mg./ml. |
| 1 | 3,742 | 2,015 | 937 | 544 |
| 2 | 3,938 | 1,578 | 854 | 659 |
| 3 | 4,000 | 1,840 | 798 | 449 |
| Mean | 3,895 | 1,811 | 861 | 551 |

NOTE.—G=Glucose, M=Maltose.

TABLE 8.—THE EFFECTS OF INSULIN ON THE METABOLISMS OF SUGARS

| | Tissue | | | |
|---|---|---|---|---|
| | Adipose tissue | | Diaphragm | |
| Insulin | − | + | − | + |
| Sugar: | | | | |
| Maltose-14C | 882 | 490 | 704 | 711 |
| | 596 | 792 | 1,015 | 1,194 |
| | 456 | 744 | 656 | 886 |
| Mean | 644 | 675 | 791 | 930 |
| Glucose-14C | 5,080 | 6,843 | 3,926 | 9,218 |
| | 6,733 | 7,237 | 3,597 | 7,933 |
| | 6,113 | 8,751 | 3,871 | 9,303 |
| Mean | 5,975 | 7,603 | 3,792 | 8,818 |

NOTE.—Tissue slice; 200 mg. Incubating for 3 hours.

In order to study the sugar metabolism following the iv injection of maltose, the variations of NEFA, potassium, and inorganic phosphate contents in blood, which are the indications of sugar metabolism, were quanitatively analyzed by comparing those obtained with the administration of glucose. Each of the contents described above declined after iv injection of glucose in male rats. Declines in the NEFA, and inorganic phosphate content in blood were observed, however, on the other hand no decrease in blood potassium content was noted. The findings show that maltose is absorbed in cells where it is metabolized as in the case of glucose. From the above tests it was established that following the iv injection of maltose in rats or humans the maltose is absorbed in vivo within the tissue cells intact, eventually hydrolyzed into glucose, and then is metabolized similarly as after an injection of glucose, and that the absorption and metabolism of maltose are independent with respect to insulin. More particularly results demonstrated that the iv injection of maltose does not cause (1) an increase in blood glucose level, (2) the absorption and metabolism are independent with respect to insulin and (3) maltose is metabolized similarly as in the case of glucose. Therefore, the injection of maltose was determined as a suitable injection for diabetics as well as for normal persons.

(3) Excretion of glucose and maltose in urine. Considerable amounts of glucose and maltose were excreted in urine as described above. However these are of no importance since they depend on individual differences, concentrations of the sugars and the injection rates.

(4) Viscosity.—The osmotic pressure of 10% maltose solution is similar to that of 5% glucose solution, however, the viscosity of maltose is double-fold that of glucose. The 10% concentration of maltose causes no hindrance to injection, and thus iv injection of 500 ml. 10% maltose solution is possible over a 30 minute period.

From the above results a supplement of double fold calorie value as compared to the conventional sugar solution was found possible by the administration of maltose. Also maltose was found usable for diabetics showing no increase in blood sugar level. The conventional electrolite supplement solutions possess a disadvantage with respect to the calorie of the supplement. However, with the employment of maltose as the replacement for glucose a double fold amount of sugar can be used as compared to that of glucose.

The maltose employed in the above described tests was a maltose containing over 95% of maltose and the remainder being oligosaccharides, e.g. maltotriose. The process for the production of said maltose is described in the specification of French Pat. No. 2,005,306, and common starches of potato, sweet potato and corn, as well as waxy corn maize starch and amylomaize starch are employable in the invention. A 10%–25% starch slurry is heated and gelatinized at 120° C.–170° C. with or without the alpha-amylase and then cooled rapidly to 45° C.–60° C. Either alpha-1,6-glucosidase of Pseudomonas or an enzyme of Escherichia or Lactobacillus is added together with beta-amylase to the resultant. The mixture is adjusted to the desirable pH (pH 3–7), hydrolyzed for 40 hours at the optimum temperature (45° C.–60° C.), then purified and concentrated. It is necessary for sufficient purification to use, especially, activated carbon and ion exchangers. The concentration of the purified and concentrated solution is adjusted to 70%–75%, then stirred gradually and cooled for 24 hours to allow crystallization. The obtained crystals are centrifuged to obtain monohydrate crystals. Subsequent analysis showed that the constituent of the product was maltose 95%–97% and oligosaccharides mainly of maltotriose, with no content of protein and salts.

The alpha-1,6-glucosidases employable in said process for the production of maltose are enzymes produced by the use of the following mentioned bacteria.

Escherichia intermedia, ATCC 21073
Pseudomonas amyloderamosa, ATCC 21216
Streptomyces diastatochromogenes, IFO 3337
Actinomyces globisporus, IFO 12208
Nocardia asteroides, IFO 3384
Micromonospora melanosporea, IFO 12515
Thermonospora viridis, IFO 12207
Actinoplanes phillippinensis, KCC ACT-0001
Streptosporangium roseum, KCC ACT-0005
Agrobacterium tumefaciens, IFO 3085
Azotobacter indicus, IFO 3744
Bacillus cereus, IFO 3001
Erwinia aroideae, IFO 3057
Micrococcus lysodeikticus, IFO 3333
Mycobacterium phlei, IFO 3158
Sarcina albida, IAM 1012
Serratia indica, IFO 3759
Staphylococcus aureus, IFO 3061
Lactobacillus brevis, IFO 3345
Leuconostoc citrovorum, ATCC 8081
Pediococcus acidilactici, IFO 3884
Streptococcus faecalis, IFO 3128
Aerobacter aerogenes, ATCC 8724
Corynebacterium sepedonicum, IFO 3306
Aeromonas hydrophila, IFO 3820
Flavobacterium esteroaromaticum, IFO 3751
Acetobacter suboxydans, IFO 3130
Vibrio metschnikovii, IAM 1039
Enterobacter aerogenes, ATCC 8724

The maltose content of the product can be increased by the employment of a beta-amylase of either an extract solution of wheat bran (described in U.S. Pat. No. 3,492,203) or pure enzyme separated from rasped juice of fresh sweet potato (described in the specification of U.S. Ser. No. 137,026, filed Apr. 23, 1971).

The oligosaccharide present in the thus obtained maltose with a purity of over 95% is maltotriose, which is not subjected to decomposition by amylase present in blood similarly as in the case of maltose. Therefore no increase of blood glucose is exhibited following iv injection of the product. Maltotriose is a sugar that follows the same fate as that of maltose without increasing the blood glucose value and which is absorbed and digested. Whether maltotriose is unharmful to maltose was investigated with the use of pure maltotriose produced from pullulan.

Maltose purified according to the above described process, a double fold amount compared to that required for glucose, was dissolved in distilled and sterilized water, passed through a layer of purified activated carbon produced by the steam activating method, and purified. The purified solution was then diluted to give a concentration of two times that required for glucose, sterilized and packed into ampoules. The maltose injection thus produced was equal to that of glucose in the respect of osmotic pressure, and thus a calorie value of two times was attainable. In addition the maltose injection was proved to be optimum for diabetics. Furthermore, the injection can be used simultaneously with injections such as amino acids, vitamins and electrolyte. Embodiments of the invention will be illustrated with the following examples. All portions in the examples are indicated by weight unless stated otherwise.

EXAMPLE 1

2.0 gr. of either calcium chloride or calcium bromide, both of Japanese pharmacopeia grade, and 20 gr. of maltose (a purified product with a maltose content of 95%) were dissolved in 100 ml. of sterilized water, 2% of purified activated carbon produced by the steam method, were added, stirred at 40° C. for 20 minutes, filtrated and packed in ampoules.

EXAMPLE 2

4.3 gr. of sodium chloride, 0.15 gr. of potassium chloride, 0.165 gr. of calcium chloride, respectively of Japanese pharmacopeia grades, and 25 gr. of maltose (purity 95%) were admixed and dissolved in 100 ml. of sterilized water. The mixture was purified and filtrated after an addition of 2% of purified activated carbon, sterilized and then packed in ampoules.

EXAMPLE 3

50 gr. of purified maltose, and 0.0025 gr. of vitamin B were admixed and dissolved in 50 ml. of water, filtrated, and the same efficiency was obtained as in the case with the 100 gr. of glucose preparation.

What I claim is:

1. A method for providing an energy source to diabetics without increasing the blood glucose level comprising intravenously feeding the diabetic with an amount sufficient to serve as a source of energy of an aqueous solution of maltose.

2. A method in accordance with claim 1 wherein said maltose consists of over approximately 95% maltose and the remainder is mainly maltotriose.

3. A method in accordance with claim 1 wherein said concentration of maltose is approximately 10% in said aqueous solution.

4. A method in accordance with claim 1 wherein approximately 500 ml. of said maltose solution in a concentration of 10% by weight is fed in a period of 30–60 minutes.

5. A process in accordance with claim 1 wherein said solution contains equal parts of purified maltose and sterilized water and approximately 0.05% vitamin B, said maltose consisting of over approximately 95% maltose and the remainder mainly maltotriose.

6. A process in accordance with claim 1 wherein said solution contains approximately 20 parts by weight of purified maltose, approximately 100 parts of sterilized water, and approximately 2 parts of calcium chloride or calcium bromide, said maltose consisting of over approximately 95% maltose and the remainder mainly maltotriose.

References Cited

UNITED STATES PATENTS 3,470,295    9/1969    Revici _____ 424—180

RICHARD L. HUFF, Primary Examiner